United States Patent
Bogsanyi

(10) Patent No.: US 9,082,270 B2
(45) Date of Patent: Jul. 14, 2015

(54) HAPTIC DEVICE WITH MULTITOUCH DISPLAY

(75) Inventor: Francis J. D. Bogsanyi, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 13/883,357

(22) PCT Filed: Sep. 21, 2011

(86) PCT No.: PCT/EP2011/066371
§ 371 (c)(1),
(2), (4) Date: May 3, 2013

(87) PCT Pub. No.: WO2012/059264
PCT Pub. Date: May 10, 2012

(65) Prior Publication Data
US 2013/0234972 A1      Sep. 12, 2013

(30) Foreign Application Priority Data
Nov. 5, 2010   (CA) ..................................... 2719659

(51) Int. Cl.
*G06F 3/041*   (2006.01)
*G08B 6/00*    (2006.01)
*A63F 3/00*    (2006.01)
*G06F 3/01*    (2006.01)
*G06F 3/02*    (2006.01)
*G06F 3/0488*  (2013.01)

(52) U.S. Cl.
CPC .............. *G08B 6/00* (2013.01); *A63F 3/00075* (2013.01); *A63F 3/00643* (2013.01); *G06F 3/016* (2013.01); *G06F 3/0205* (2013.01); *G06F 3/0488* (2013.01); *A63F 2300/1037* (2013.01); *A63F 2300/1075* (2013.01); *G06F 2203/04104* (2013.01); *G06F 2203/04808* (2013.01)

(58) Field of Classification Search
CPC .......... G06F 3/016; G06F 2203/04104; G06F 2203/04808
See application file for complete search history.

(56) References Cited

U.S. PATENT DOCUMENTS

| | | | |
|---|---|---|---|
| 6,518,951 B1 | 2/2003 | Keyson | |
| 6,819,312 B2 | 11/2004 | Fish | |
| 7,508,382 B2 | 3/2009 | Denoue et al. | |
| 2002/0021283 A1 | 2/2002 | Rosenberg et al. | |
| 2003/0184574 A1 | 10/2003 | Phillips et al. | |
| 2006/0097991 A1 | 5/2006 | Hotelling et al. | |
| 2009/0002328 A1 | 1/2009 | Ullrich et al. | |

(Continued)

OTHER PUBLICATIONS

International Searching Authority, International Search Report and Written Opinion for International Application No. PCT/EP2011/066371, Mailed Dec. 7, 2011.

(Continued)

*Primary Examiner* — Latanya Bibbins
(74) *Attorney, Agent, or Firm* — Law Office of Jim Boice

(57) ABSTRACT

A method, apparatus, and/or computer program product integrates one or more haptic devices with a multi-touch display. One or more haptic devices are placed upon a multi-touch display surface to form a set of identified haptic devices. The set of identified haptic devices is calibrated upon the multi-touch display surface, where calibration provides localized haptic interaction over subsets of the multi-touch display surface, thus enabling feedback to the identified haptic devices.

17 Claims, 6 Drawing Sheets

(56) References Cited

U.S. PATENT DOCUMENTS

| | | | |
|---|---|---|---|
| 2009/0085878 A1 | 4/2009 | Heubel et al. | |
| 2009/0167704 A1 | 7/2009 | Terlizzi | |
| 2010/0066681 A1 | 3/2010 | Malabuyo | |
| 2010/0083109 A1 | 4/2010 | Tse et al. | |
| 2010/0171891 A1 | 7/2010 | Kaji et al. | |
| 2011/0018697 A1* | 1/2011 | Birnbaum | 340/407.2 |

OTHER PUBLICATIONS

Synaptics, Inc., "Synaptics: Synaptics Home", 2012, Retrieved Apr. 29, 2013, pp. 1-2, <http://www.pacinian.com/>.

M. Weiss et al., "Slap Widgets: Bridging the Gap Between Virtual and Physical Controls on Tabletops", CHI'09 Proceedings of the SIGCHI Conference on Human Factors in Computing Systems, ACM, New York, NY, US, 2009, pp. 481-490, (Abstract Only).

S. Yoshida, "Proactive Desk II: Development of a New Multi-Object Haptic Display Using a Linear Induction Motor", Virtual Reality Conference, 2006, pp. 269-272, (Abstract Only).

Anonymous, "Phantom Omni Haptic Device", Sensable, 2013, Retrieved Apr. 29, 2013, pp. 1-2, <http://www.sensable.com/haptic-phantom-omni.htm>.

Anonymous, "The Most Immersive Way to Play Video Games", Novint Technologies Inc., 2012, Retrieved Apr. 29, 2013, pp. 1-4, <http://home.novint.com/index.php/products/novintfalcon>.

Anonymous, "Diamondtouch by Circle Twelve", Circle Twelve Inc., 2010, Retrieved Apr. 29, 2013, p. 1, <http://www.circletwelve.com/products/diamondtouch.html>.

Anonymous, "Surface by Microsoft—The New Tablet PC", Microsoft, Retrieved Apr. 29, 2013, pp. 1-2, <http://www.microsoft.com/Surface/en-US>.

J. Lee et al., "Haptic Pen: A Tactile Feedback Stylus for Touch Screens", UIST'04, vol. 6, Issue 2, ACM, 2004, pp. 291-294.

E. Joasoon, "Multi-Touch User Interface With Tactile Feedback", Proceedings of Interfaces and Human Computer Interaction 2007, IADIS Press, 2007, pp. 223-226.

\* cited by examiner

400
Haptic work volumes on a multi-touch display

HAPTIC DEVICE WITH MULTITOUCH DISPLAY

BACKGROUND

This disclosure relates generally to input devices in a data processing system and more specifically to calibrating one or more haptic devices with a multi-touch display in the data processing system.

The term "haptics" refers to the sense of touch. Haptic technology involves human computer interaction devices that interface using a sense of touch applying forces, vibrations, and/or motions to the user. Multi-touch displays support sensing of multiple interaction points on a display surface. Example multi-touch systems typically include smart devices such as phones with touch sensitive screens and kiosks with touch screens. Multi-touch sensing extends beyond the detection of human fingertips and can include detection of a variety of physical objects and visual markers, depending on the sensing technology adopted.

The combination of one or more haptic devices with a visual display is known as a "hapto-visual system". Such systems may be collocated, where the haptic interaction and visual display volumes overlap. Several hapto-visual systems have been developed since the late 1960s. Most hapto-visual systems comprise a liquid crystal display (LCD) or cathode ray tube (CRT) desktop monitor reflected in a half-silvered mirror with a haptic device mounted behind the mirror. The user observes a stereoscopic image projected by the monitor by looking at the mirror, such that the virtual object represented by the image appears to be located behind the mirror, and holds the haptic device. The combined effect is one of "hands on" interaction with a virtual object or environment, in which the user can see and touch virtual objects as if the virtual objects were physical objects. Typical large-scale systems however use a different design where a large haptic device is situated in front of a large display surface.

The hapto-visual systems described above incorporate a robotic device for force-feedback. Alternative haptic devices have been integrated with display devices, including: tactile displays, such as technology that provides either limited display deformation or vibration feedback; physical widgets, such as silicone illuminated active peripheral (SLAP) widgets that use passive resistance to simulate control widgets on the display surface; and the use of magnetic induction to move objects on a display surface, such as provided by a Proactive Desk.

Personal hapto-visual systems typically limit collaboration between physically adjacent colleagues. Only one user can interact with such a system at a given moment. Personal hapto-visual systems also limit visual context due to their use of small-scale display devices. Increasing the number of haptic devices in a personal hapto-visual system, for example to support bimanual interaction, is difficult due to overlapping physical work volumes and a high probability of collision between haptic devices. Large-scale hapto-visual systems limit the work volume accessible by the haptic device to a fixed subset of the visual display surface and additionally obscure substantial portions of the visual display with parts of the haptic device. Large-scale hapto-visual systems also pose safety risks due to the close proximity of a large robotic (haptic) device to the body and head of a user while the attention of the user is focused on the visual display.

Tactile displays and active peripherals limit the haptic working volume to the display plane. A user only feels haptic feedback while the fingers of the user are in contact with the display surface, which is a severe restriction in stereoscopically projected visual virtual environments.

In the field of haptic devices, several current solutions are available including a two dimensional hapto-visual system using an electro-magnetic device or a resistive ballpoint in a stylus (pen) for obtaining force-feedback. Interaction with multiple styluses is described. The two dimensional hapto-visual system is essentially an "active peripheral", however, with limitations.

Another example of a solution may be viewed as a trivial extension of a vibro-tactile display to accommodate multi-touch sensing. A similar variation of the previously stated vibro-tactile display system provides an emphasis on non-visual feedback in portable devices, for example, by providing a capability to locate graphic user interface widgets without examining the display.

In another example of a current solution, a variant of a tactile display is presented in which the surface of the display deforms either in response to a touch of the user or to emphasize two dimensional graphic user interface (GUI) elements such as active button widgets. The example solution has similar limitations as other tactile displays currently available.

In another example of current solutions, a combination of displays (some touch-sensitive, some not) and physical buttons (such as those on a game controller) provides a capability in which the device as a whole may vibrate or the physical buttons may provide force-feedback. The motion or feedback may be, for example, refusing to depress, in response to the combination of something displayed on one of the displays and a physical button or touch-screen press from a user.

In another example a haptic stylus provides a variety of vibration effects. For example, a vibrating haptic stylus is similar to tactile display systems except the actuator providing haptic feedback is mounted in the stylus rather than in the display. A further variation on tactile multi-touch displays, as previously described, includes a tactile element attached to the fingers of a user rather than the stylus or the display as stated previously.

Existing hapto-visual systems limit the scale of collocated hapto-visual interaction, impede collaboration between multiple simultaneous users and, in larger systems, risk safety and increase cost through placement of large robotic devices in close proximity to the head of a user.

SUMMARY

According to one embodiment, a computer-implemented process/method for integrating one or more haptic devices with a multi-touch display is presented. The computer-implemented process/method identifies one or more haptic devices to form a set of identified haptic devices upon a multi-touch display surface and calibrates the identified haptic devices upon the multi-touch display surface, wherein calibration provides localized haptic interaction over subsets of the multi-touch display surface. The computer-implemented process/method further enables feedback to the identified haptic devices.

According to another embodiment, a computer program product for integrating one or more haptic devices with a multi-touch display is presented. The computer program product comprises a computer recordable-type media containing computer executable program code stored thereon. The computer executable program code comprises computer executable program code for identifying one or more haptic devices to form a set of identified haptic devices upon a multi-touch display surface, computer executable program code for calibrating the identified haptic devices upon the multi-touch display surface, wherein calibration provides localized haptic interaction over subsets of the multi-touch display surface and computer executable program code for enabling feedback to the identified haptic devices.

According to another embodiment, an apparatus for integrating one or more haptic devices with a multi-touch display is presented. The apparatus comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to identify one or more haptic devices to form a set of identified haptic devices upon a multi-touch display surface, calibrate the identified haptic devices upon the multi-touch display surface, wherein calibration provides localized haptic interaction over subsets of the multi-touch display surface and enable feedback to the identified haptic devices.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
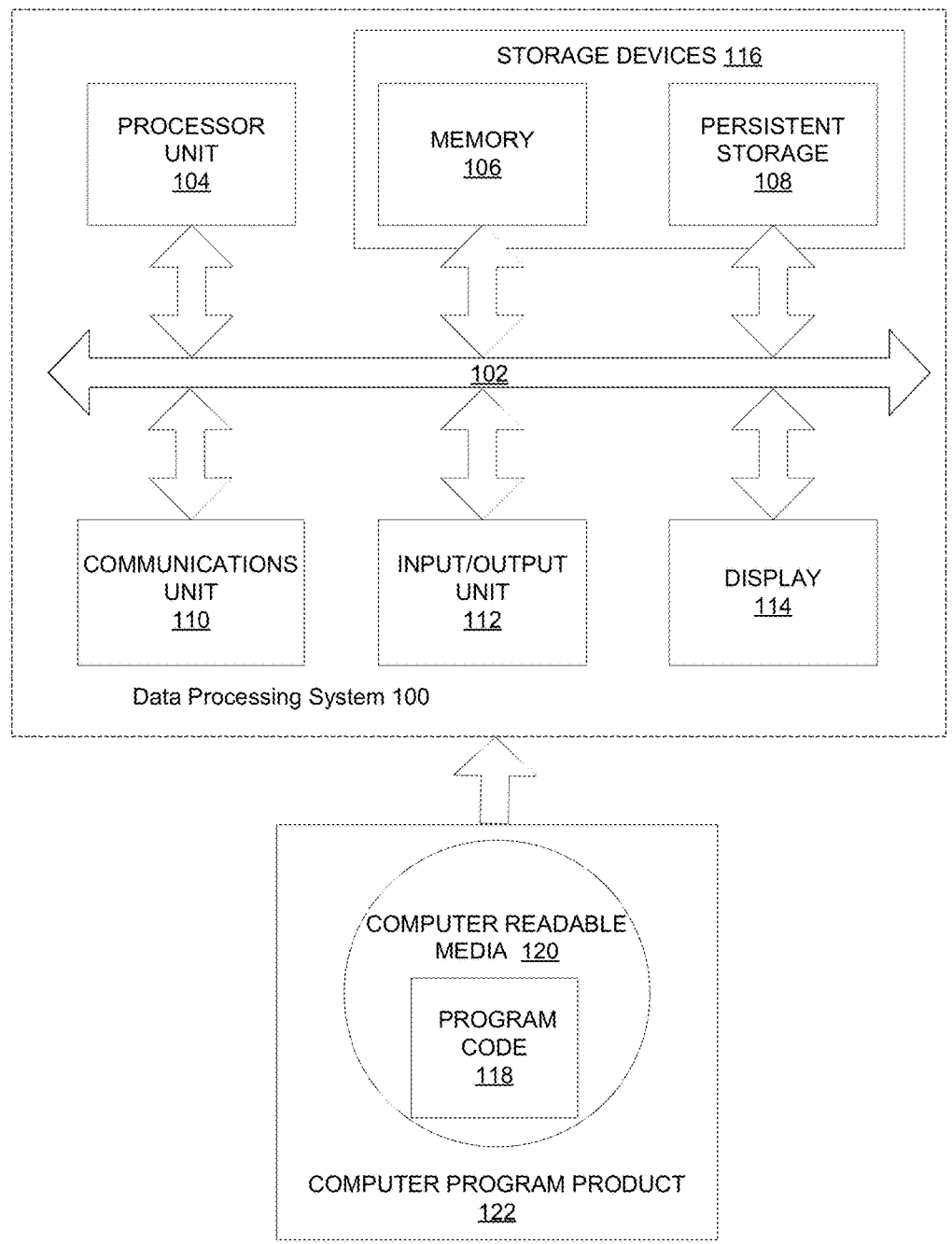
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for integrating one or more haptic devices with a multi-touch display is presented. Using data processing system 100 of FIG. 1 as an example, an illustrative embodiment provides the computer-implemented process stored in memory 106, executed by processor unit 104, for integrating one or more haptic devices with a multi-touch display. Processor unit 104 identifies one or more haptic devices to form a set of identified haptic devices upon a multi-touch display surface and calibrates the identified haptic devices upon the multi-touch display surface, wherein calibration provides localized haptic interaction over subsets of the multi-touch display surface. Processor unit 104 further enables feedback to the identified haptic devices. In another example, a computer-implemented process, using program code 118 stored in memory 106 or as a computer program product 122, for integrating one or more haptic devices with a multi-touch display is presented.

In an alternative embodiment, program code 118 containing the computer-implemented process may be stored within computer readable media 120 as computer program product 122. In another illustrative embodiment, the process for integrating one or more haptic devices with a multi-touch display may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
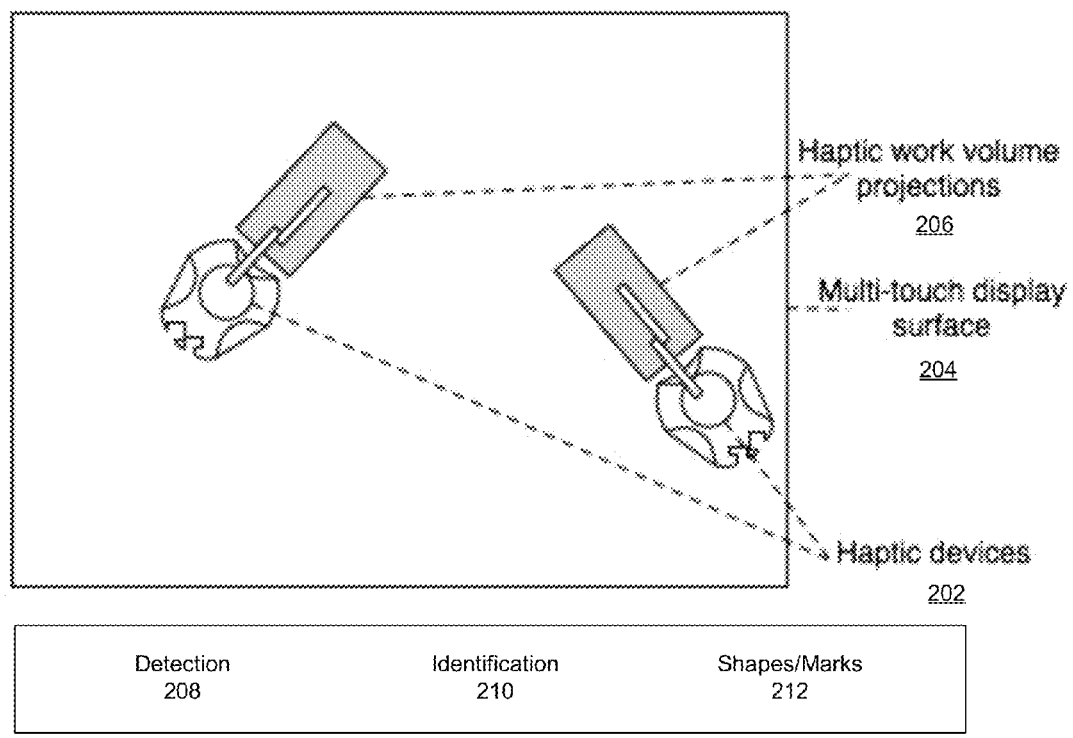
FIG. 2 is a block diagram of a haptic visual feedback system, in accordance with various embodiments of the disclosure.

With reference to FIG. 2, a block diagram of a haptic visual feedback system, in accordance with various embodiments of the disclosure is presented. System 200 is an example of a haptic visual feedback system used to calibrate haptic and visual feedback. System 200 provides a capability to calibrate haptic and visual feedback with respect to how a haptic work volume relates to a display. For example, a surgical simulation system that represents a scalpel via a haptic device and represents a human organ visually via a display surface may calibrate haptic and visual feedback such that observed intersection of the tip of the haptic device end effector with the visual presentation of the human organ will correspond with a visual update presenting an incision in the displayed human organ at the point of intersection and force feedback through the haptic device presenting contact between the scalpel and the human organ.

The components of system 200 provide a capability of placing one or more small-scale, commodity haptic devices directly on a sensing "multi-touch" display surface, and dynamically moving the haptic devices on the surface. Embodiments of system 200 typically solve the problems of scale in collocated hapto-visual systems, collaboration between multiple simultaneous users, improving safety and reducing cost when integrating haptic devices with large-scale visual displays.

System 200 is a combination of commodity haptic devices 202 with a multi-touch display surface 204 enabling localized haptic interaction over subsets of the display surface. One or more haptic devices 202 are placed on multi-touch display surface 204 and multi-touch display surface 204 senses a presence on the surface using a mechanism such as detection 208. System 200 automatically calibrates haptic and visual feedback, recalibrating when one or more haptic devices 202 are relocated, and haptic feedback is disabled when presence of one or more haptic devices 202 are no longer sensed by multi-touch display surface 204.

Haptic work volume projections 206 are projected areas on the surface of multi-touch display surface 204. The projections are regions of the display in which physical interaction with displayed images is possible through feedback to effectors, including handles, of an associated haptic device. Identification 210 determines which particular haptic device is active and calculates a respective work volume projection accordingly. Identification 210 may also provide a distinguishing mark for an occurrence of a haptic device in a set of homogeneous devices to distinguish one device from another similar device. Shapes/marks 212 provides a storage repository to store, maintain and look-up shapes and marks associated with haptic devices. For example, a detected shape may be compared with a stored shape in shapes/marks 212 to identify a specific haptic device from a plurality of haptic devices. Feedback notification may be communicated to the detected haptic device in accordance with specifications of the haptic device.

Compared with previous available personal hapto-visual workbenches, system 200 enables multiple users to collaborate around the surface of the display table, each user having a capability for haptic interaction with visual information, where the haptic interaction occurs over a larger display area. Support for the use of haptic device 202 with a large multi-touch display surface 204 enables multiple haptic devices to be used simultaneously without physical conflict among the workspaces associated with respective haptic devices. Additionally, a large display surface of multi-touch display surface 204 typically provides more visual context for user interaction than a personal hapto-visual workbench.

Compared with current larger scale hapto-visual displays, system 200 typically has a significantly lower cost, due to the use of commodity haptic devices, haptic devices 202, and improved safety. Large-scale hapto-visual display systems typically place users in close proximity to a large robotic device while the users focus attention on a visual display. In contrast with such systems, system 200 enables automatic disengagement of haptic feedback when a haptic device is removed from the display surface, use of smaller commodity haptic devices capable of exerting lower forces and no longer places a haptic device in close proximity to the head of a user. System 200 also provides high fidelity haptic interaction over an entire display surface, due to an ability to dynamically relocate a haptic device, whereas large scale hapto-visual displays feature a "sweet spot" for haptic interaction and therefore do not completely cover the display surface, due to a fixed base and limited reach of the haptic device.

Compared with tactile displays, such as those from Pacinian Corporation, and active peripherals, such as silicone illuminated active peripherals widgets, system 200 provides high fidelity haptic interaction in 3 dimensions, with multiple degrees of freedom. Commodity haptic devices typically allow more general haptic interaction than tactile displays, including simulation of handheld tools in virtual reality simulations.

Figure 3:
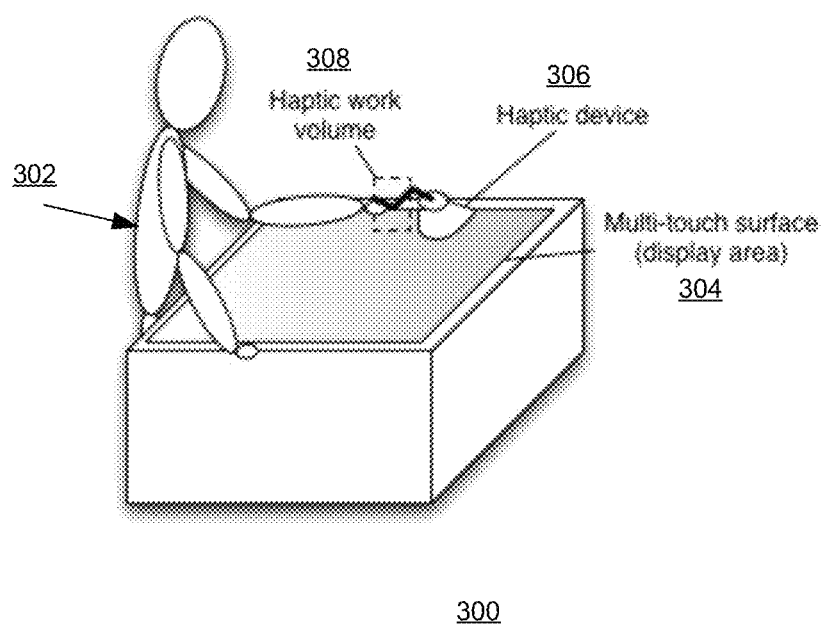
FIG. 3 is a pictorial diagram of a haptic device in operation with a multi-touch surface, in accordance with one embodiment of the disclosure.

With reference to FIG. 3, a pictorial diagram of a haptic device in operation with a multi-touch surface, in accordance with one embodiment of the disclosure is presented. System 300 depicts an example interaction between a user and a haptic device using a multi-touch surface.

User 302 manipulates haptic device 306 on multi-touch surface 304 typically using a handle or other control mechanism. Haptic work volume 308 is a three dimensional spatial region reachable by the end effector of haptic device 306 without moving the base of haptic device 306 on multi-touch surface 304.

Figure 4:
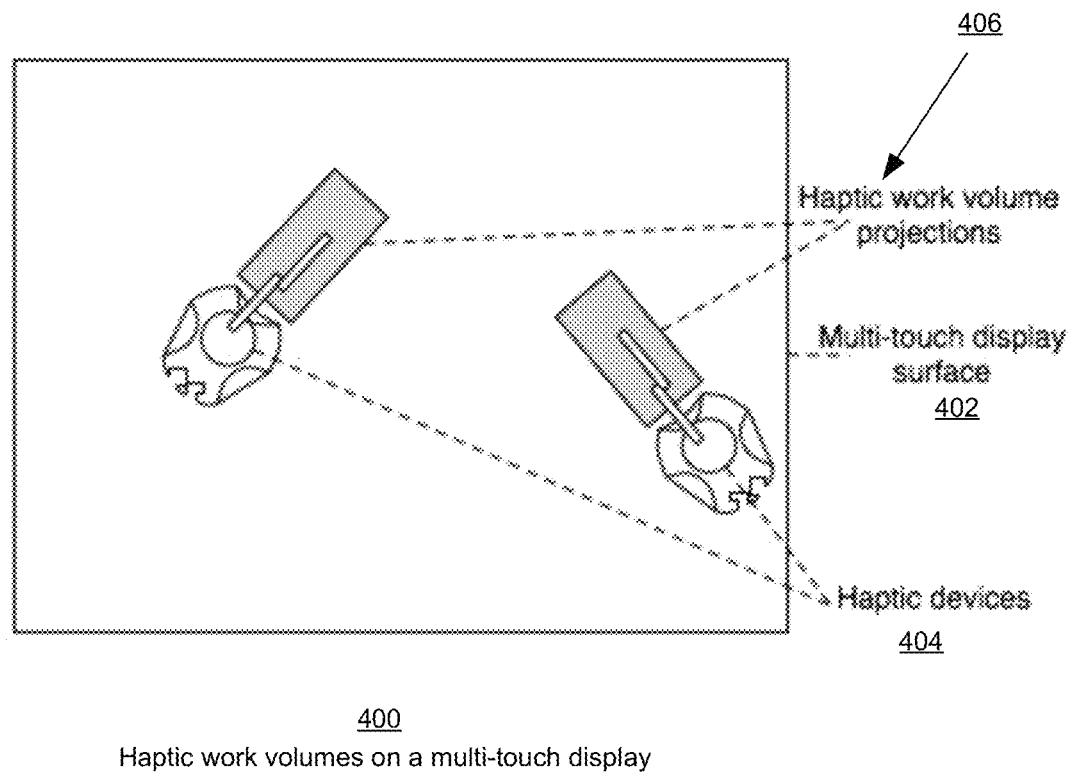
FIG. 4 is a pictorial diagram of haptic work volume projections on a multi-touch display, in accordance with one embodiment of the disclosure.

With reference to FIG. 4, a pictorial diagram of haptic work volume projections on a multi-touch display, in accordance with one embodiment of the disclosure is presented. FIG. 4 is an example of a combination of haptic devices and a multi-touch display table of FIG. 3 providing localized haptic interaction over subsets of the display area.

View 400 represents a combination of a multi-touch display table, multi-touch display surface 402, with two commodity haptic devices, shown as haptic devices 404, to provide localized haptic interaction over defined subsets of multi-touch display surface 402. Haptic devices 404 are low-cost devices with a small work volume and high fidelity sensing capable of providing haptic feedback in three or more degrees of freedom. Examples of the relatively low-cost devices include the PHANTOM Omni® ("PHANTOM Omni" is a registered trademark of SensAble Technologies, Inc. in the United States and/or other countries) and the Falcon® ("Novint Falcon" is a registered trademark of Novint Technologies, Inc. in the United States and/or other countries). Examples of multi-touch display tables including the DiamondTouch and the Microsoft Surface® ("Microsoft" and "Surface" are registered trademarks in the United States and/or other countries) provide a larger display area than a working volume of commodity haptic devices. For example, the DiamondTouch has an active display area of 86 cm×65 cm, whereas the PHANTOM Omni has a working volume of 16 cm×7 cm with a height of 12 cm. Accordingly, when a commodity haptic device, such as one of haptic devices 404, is placed on a multi-touch display table, the haptic working volume includes only a subset of the active visual display area of the multi-touch display table. Placing multiple haptic devices on the multi-touch display table provides haptic feedback over several subsets of the display depicted as haptic work volume projections 406.

One or more haptic devices 404 are placed on multi-touch display surface 402 and the table senses the presence of haptic devices 404 on the surface. Multi-touch display surface 402 is capable of sensing shapes of objects placed on the display surface. Haptic devices 404 such as the PHANTOM Omni and the Falcon have distinctively shaped bases, enabling placement of a haptic device on the display surface to be easily distinguished from other contact devices or elements, such as fingertips. The simultaneous presence of multiple, heterogeneous devices can be detected, by a same standard means, to support haptic feedback over several subsets of the display. Multiple homogenous devices can be distinguished using markers such as those described for a thin form-factor interactive surface technology such as a ThinSight display surface from Microsoft® (Microsoft is a registered trademark of Microsoft Corporation in the United States and/or other countries).

The system automatically calibrates haptic and visual feedback, recalibrating when a haptic device is relocated. Similarly haptic feedback is disabled when presence of a haptic device is not sensed by the display. The distinctive shape of a haptic device base further enables the system, such as system 400, to identify position and orientation of haptic devices 404 on multi-touch display surface 402, which in turn allows the sensed position and orientation of the haptic device end effector to be calibrated with respect to a displayed image, providing collocated hapto-visual interaction within the working volume of the haptic device.

Haptic devices 404 can be dynamically relocated on multi-touch display surface 402 by lifting a device base and placing the device elsewhere on the table, or by sliding the device base. Once the haptic device base has come to rest, a new position and orientation is sensed by means previously described. Haptic feedback is re-calibrated to provide collocated hapto-visual interaction for a possibly different subset of the display surface. When haptic devices 404 are removed from multi-touch display surface 402, the working volumes associated with haptic devices 404 are not collocated with any portion of multi-touch display surface 402. In this situation, haptic feedback may be disabled to avoid force feedback from unseen sources and thereby increase safety. Similarly, when haptic devices 404 are slid across multi-touch display surface 402, haptic devices 404 may interact unexpectedly with virtual objects displayed on multi-touch display surface 402, accordingly haptic feedback may be disabled as well and re-enabled when position and orientation of the device bases are sensed to have stabilized, for example, by remaining at a same location for a defined period of time.

Figure 5:
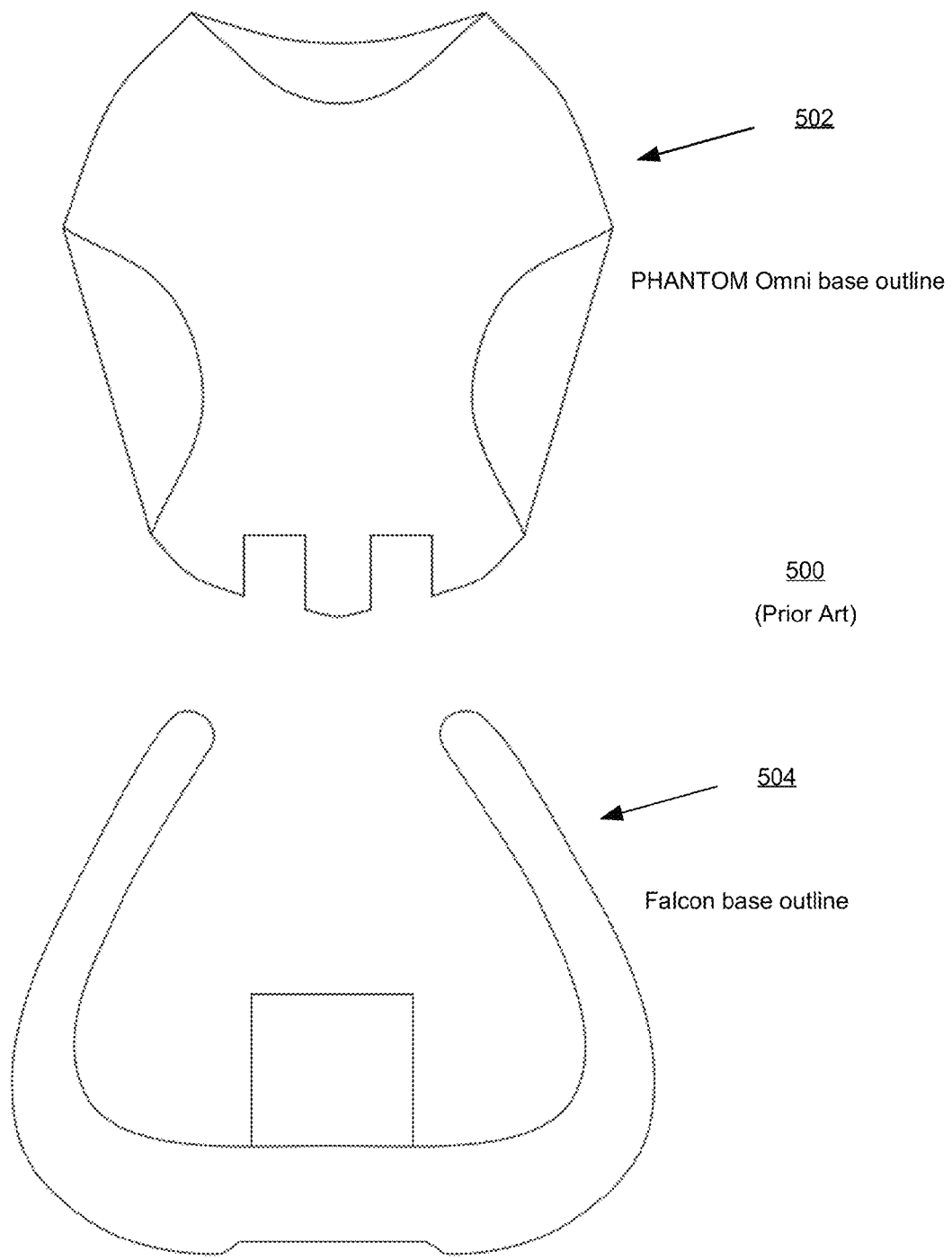
FIG. 5 is a pictorial diagram of specific haptic device footprints, in accordance with one embodiment of the disclosure.

With reference to FIG. 5, a pictorial diagram of specific haptic device footprints, in accordance with one embodiment of the disclosure are presented. Shapes 500 are examples representative of typical haptic device footprint shapes currently available.

Shape 502 is representative of the footprint distinguishing the object as a Phantom Omni device base outline. Shape 504 is representative of the footprint distinguishing the object as a Falcon device base outline. Multi-touch display surface 402 of FIG. 4 is capable of sensing shapes of objects placed on a respective display surface. Haptic devices 404 such as PHANTOM Omni and Novint Falcon have distinctively shaped bases, as shown in FIG. 5, therefore placement of a haptic device on a display surface can typically be easily distinguished from other contact elements, such as fingertips of an operator. The capability to distinguish a sensed position and orientation of a haptic device further enables the haptic device end effector to be calibrated.

Figure 6:
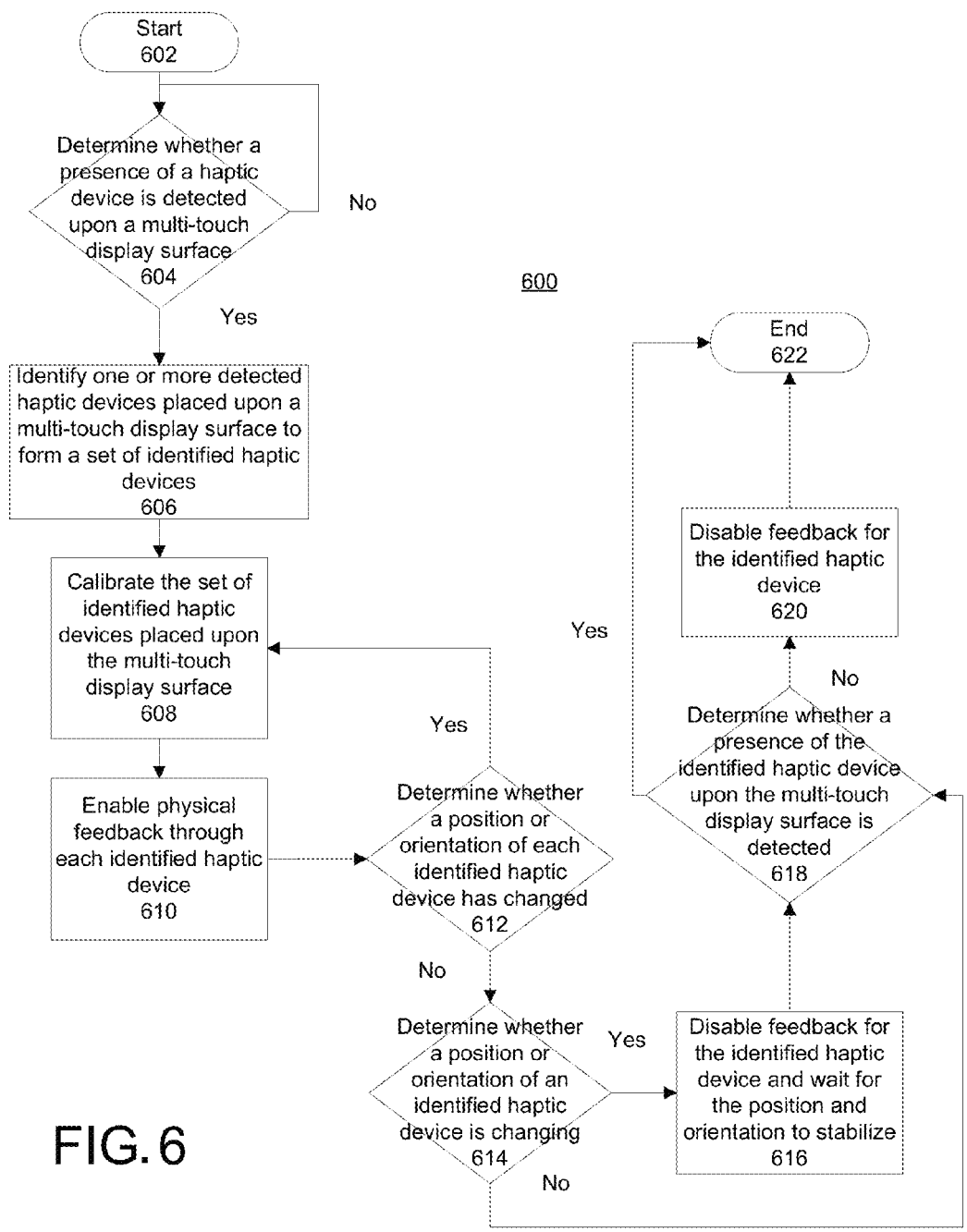
FIG. 6 is a flowchart of a process of integrating a haptic device with a multi-touch display, in accordance with one embodiment of the disclosure.

With reference to FIG. 6, a flowchart of a process of integrating a haptic device with a multi-touch display is presented. Process 600 is an example of a process using system 200 of FIG. 2.

Process 600 begins (step 602) and determines whether a presence of a haptic device is detected (step 604). When a determination is made that a presence of a haptic device is not detected, process 600 loops back to perform step 604. When a determination is made that a presence of one or more haptic devices is detected, process 600 identifies the one or more detected haptic devices to form a set of identified haptic devices (step 606). A set contains one or more haptic devices.

Process 600 calibrates the set of identified haptic devices placed upon the multi-touch display surface (step 608). Calibration provides localized haptic interaction over subsets of the multi-touch display surface. The subsets of the multi-touch display surface are calculated as a set of haptic work volumes associated with respective identified haptic devices. Process 600 enables physical feedback through the identified haptic devices (step 610). Additional auditory, visual or a combination of sensory feedback appropriate to the haptic devices and scenario may be provided through other devices. Feedback is meant to be meaningful to a user to indicate a condition of the haptic devices with respect to the multi-touch display surface.

Process 600 determines whether the position or orientation of an identified haptic device has changed (step 612). When a determination is made that the position or orientation of an identified haptic device has changed, (yes), process 600 loops back to perform step 608 as before. When a determination is made that the position and orientation of the identified haptic device has not changed, process 600 determines whether the position or orientation of the identified haptic device is changing (step 614).

When a determination is made that the position or orientation of the identified haptic device is changing, (yes), process 600 disables feedback for the identified haptic device and waits for the position and orientation to stabilize (step 616). The wait time is a predetermined duration that is configurable for a haptic device and may be set as a default time period. Process 600 proceeds with step 618.

When a determination is made that the position and orientation of the identified haptic device is not changing, process 600 determines whether the presence of the identified haptic device is detected (step 618). When a determination is made that the presence of the identified haptic device is detected process 600 terminates (step 622). When a determination is made that the presence of the identified haptic device is not detected process 600 disables feedback for the identified haptic device (step 620) and terminates thereafter (step 622). When process 600 determines an identified haptic device is not detected, process 600 presumes the haptic device is no longer in the presence of the multi-touch display surface and therefore no longer should be considered for feedback communication.

Thus is presented in one embodiment a computer-implemented process for integrating one or more haptic devices with a multi-touch display. The computer-implemented process identifies one or more haptic devices to form a set of identified haptic devices upon a multi-touch display surface. The computer-implemented process further calibrates the identified haptic devices upon the multi-touch display surface, wherein calibration provides localized haptic interaction over subsets of the multi-touch display surface and enables feedback to the identified haptic devices.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for integrating one or more haptic devices with a multi-touch display, the method comprising:
    identifying, by one or more processors, one or more haptic devices placed upon a multi-touch display surface to form a set of identified haptic devices;
    calibrating, by one or more processors, the set of identified haptic devices upon the multi-touch display surface, wherein calibration provides localized haptic interaction over subsets of the multi-touch display surface;
    enabling, by one or more processors, feedback to each identified haptic device;
    determining, by one or more processors, whether position or orientation of each identified haptic device upon the multi-touch display surface has changed;
    responsive to a determination by one or more processors that the position and orientation of an identified haptic device upon the multi-touch display surface has not changed, determining, by one or more processors, whether the position or orientation of the identified haptic device upon the multi-touch display surface is changing; and
    responsive to a determination that the position or orientation of the identified haptic device upon the multi-touch display surface is changing, disabling, by one or more processors, feedback for the identified haptic device and waiting for the position and orientation to stabilize.

2. The method of claim 1, wherein identifying one or more haptic devices to form a set of identified haptic devices further comprises:
    determining, by one or more processors, whether a presence of a haptic device is detected upon the multi-touch display surface.

3. The method of claim 1, wherein calibrating the set of identified haptic devices upon a multi-touch display surface further comprises:
    calculating, by one or more processors, subsets of the multi-touch display surface as projections of a set of haptic work volumes associated with respective identified haptic devices, wherein the calculation further comprises orientation of the haptic devices.

4. The method of claim 1, further comprising:
    responsive to a determination by one or more processors that the position or orientation of an identified haptic device has changed, calibrating, by one or more processors, the identified haptic device upon the multi-touch display surface, wherein calibration provides collocated hapto-visual interaction over a different subset of the multi-touch display surface.

5. The method of claim 1, further comprising:
    determining, by one or more processors, whether a presence of the identified haptic device upon the multi-touch display surface is detected; and
    responsive to a determination, by one or more processors, that the presence of the identified haptic device upon the multi-touch display surface is not detected, disabling, by one or more processors, feedback for the identified haptic device.

6. The method of claim 1, further comprising:
    waiting for the position and the orientation to stabilize for a predetermined period of time, wherein the predetermined period of time is configured specifically for the identified haptic device.

7. A computer program product for integrating one or more haptic devices with a multi-touch display, the computer program product comprising:
    a non-transitory computer recordable-type media containing computer executable program code stored thereon, the computer executable program code comprising:
    computer executable program code for identifying one or more haptic devices placed upon a multi-touch display surface to form a set of identified haptic devices;
    computer executable program code for calibrating the set of identified haptic devices upon the multi-touch display surface, wherein calibration provides localized haptic interaction over subsets of the multi-touch display surface;
    computer executable program code for enabling feedback to each identified haptic device;
    computer executable program code for determining whether a position or orientation of each identified haptic device upon the multi-touch display surface has changed;
    computer executable program code for, responsive to a determination that the position and orientation of an identified haptic device upon the multi-touch display surface has not changed, determining whether the position or orientation of the identified haptic device upon the multi-touch display surface is changing; and
    computer executable program code for, responsive to a determination that the position or orientation of the identified haptic device upon the multi-touch display surface is changing, disabling feedback for the identified haptic device and waiting for the position and orientation to stabilize.

8. The computer program product of claim 7, wherein said computer executable program code for identifying one or more haptic devices to form a set of identified haptic devices further comprises:
    computer executable program code for determining whether a presence of a haptic device is detected upon the multi-touch display surface.

9. The computer program product of claim 7, wherein computer executable program code for calibrating the set of identified haptic devices upon a multi-touch display surface further comprises:
    computer executable program code for calculating subsets of the multi-touch display surface as projections of a set of haptic work volumes associated with respective identified haptic devices, wherein the calculation further comprises orientation of the haptic devices.

10. The computer program product of claim 7, further comprising:
    computer executable program code for, responsive to a determination that the position or orientation of an identified haptic device has changed, calibrating the identified haptic device upon the multi-touch display surface, wherein calibration provides collocated hapto-visual interaction over a different subset of the multi-touch display surface.

11. The computer program product of claim 7, further comprising:
- computer executable program code for determining whether the presence of the identified haptic device upon the multi-touch display surface is detected; and
- computer executable program code for, responsive to a determination that the presence of the identified haptic device upon the multi-touch display surface is not detected, disabling feedback for the identified haptic device.

12. The computer program product of claim 7, further comprising:
- computer executable program code for waiting for the position and the orientation to stabilize for a predetermined period of time, wherein the predetermined period of time is configured specifically for the identified haptic device.

13. An apparatus for integrating a haptic device with a multi-touch display, the apparatus comprising:
- a communications fabric;
- a memory connected to the communications fabric, wherein the memory contains computer executable program code;
- a communications unit connected to the communications fabric;
- an input/output unit connected to the communications fabric;
- a display connected to the communications fabric; and
- a processor unit connected to the communications fabric, wherein the processor unit executes the computer executable program code to direct the apparatus to:
- identify one or more haptic devices to form a set of identified haptic devices upon a multi-touch display surface;
- calibrate the set of identified haptic devices upon the multi-touch display surface, wherein calibration provides localized haptic interaction over subsets of the multi-touch display surface;
- enable feedback to the set of identified haptic devices;
- determine whether a position or orientation of each identified haptic device upon the multi-touch display surface has changed;
- responsive to a determination that the position and orientation of an identified haptic device upon the multi-touch display surface has not changed, determine whether the position or orientation of the identified haptic device upon the multi-touch display surface is changing; and
- responsive to a determination that the position or orientation of the identified haptic device upon the multi-touch display surface is changing, disable feedback for the identified haptic device and wait for the position to stabilize, wherein the waiting is for one of a time of a predetermined duration that is configurable for a haptic device and a time set as a default time period.

14. The apparatus of claim 13, wherein the processor unit executes the computer executable program code to identify one or more haptic device to form a set of identified haptic device by further directing the apparatus to:
- determine whether the presence of a haptic device is detected upon the multi-touch display surface.

15. The apparatus of claim 13, wherein the processor unit executes the computer executable program code to calibrate the set of identified haptic devices upon a multi-touch display surface by further directing the apparatus to:
- calculate subsets of the multi-touch display surface as projections of a set of haptic work volumes associated with respective identified haptic devices, wherein the calculation further comprises orientation of the haptic device.

16. The apparatus of claim 13 wherein the processor unit further executes the computer executable program code to direct the apparatus to:
- responsive to a determination that the position or orientation of an identified haptic device has changed, calibrate the identified haptic device upon the multi-touch display surface, wherein calibration provides collocated haptovisual interaction for a different subset of the multi-touch display surface.

17. The apparatus of claim 13, wherein the processor unit further executes the computer executable program code to direct the apparatus to:
- determine whether the presence of the identified haptic device upon the multi-touch display surface is detected; and
- responsive to a determination that the presence of the identified haptic device upon the multi-touch display surface is not detected, disable feedback for the identified haptic device.

* * * * *